Patented Dec. 17, 1929

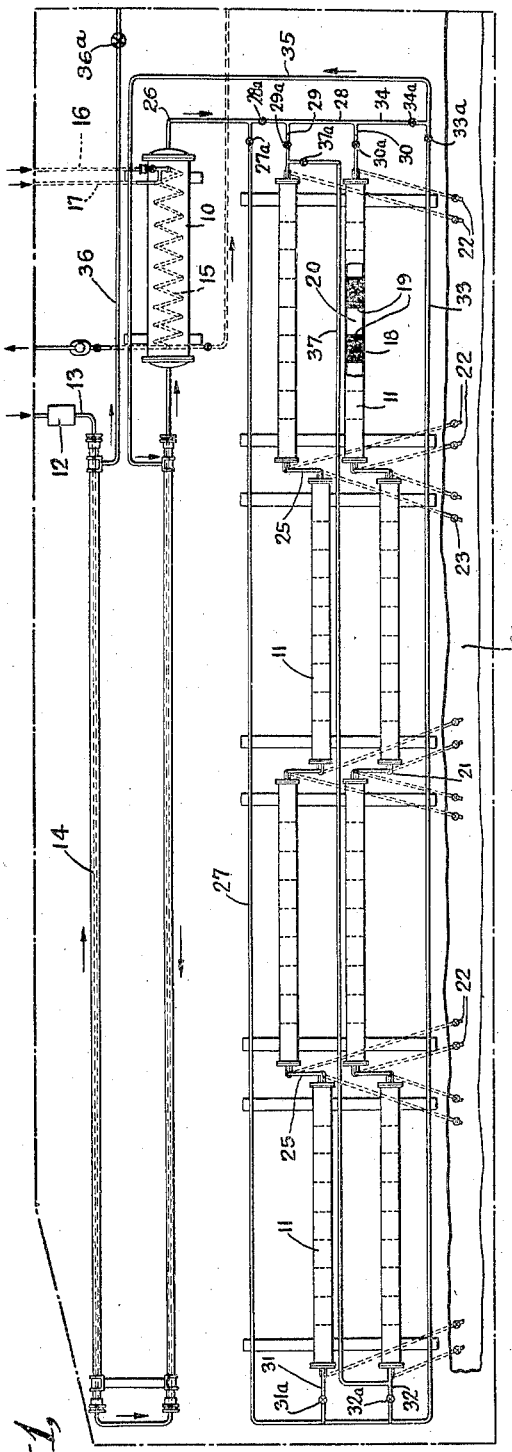

1,740,275

UNITED STATES PATENT OFFICE

ARTHUR B. STEEN, OF HOUSTON, TEXAS, ASSIGNOR, BY MESNE ASSIGNMENTS, TO THE TEXAS COMPANY, OF NEW YORK, N. Y., A CORPORATION OF DELAWARE

APPARATUS FOR TREATING OIL

Application filed September 22, 1923. Serial No. 664,151.

This invention relates in general to the dehydration of oil and to the resolution of emulsions, such as oil field emulsions.

Petroleum as it comes from the ground in some districts, such as California, Mexico and the gulf coast region, is often found in a state of admixture or emulsion with water or saline or soap solutions. I am aware that many processes and various types of apparatus have been proposed for the resolution of these oil field emulsions. Some of the schemes proposed have been partially successful in effecting a dehydration of the more simple admixtures or emulsions of oil and water but so far as I know none of the methods proposed have been commercially successful in effecting a resolution of the more refractory emulsions. Some of the methods proposed are so expensive that they cannot be considered from a commercial standpoint and some require such extended periods of treatment that they are not feasible for industrial application.

The primary object of the present invention is to provide a means for effecting an efficient resolution of oil field emulsions in a rapid and continuous manner so that the destruction of these emulsions and the freeing of the oil from the sediment and solutions with which it is admixed may be carried on industrially.

I have found that oil in which water is present in emulsified form may be readily dehydrated, even in the case of the most refractory emulsions, by subjecting the oil or emulsion to the combined action of heat and contact with filamentary or threadlike material of the nature of excelsior. When the emulsion in a heated condition is forced through excelsior or similar threadlike material, the protective colloids or envelopes which enclose the minute drops of material of which the emulsion is formed are apparently destroyed by contact with the threads or filaments with the resultant coalescence of particles of like phase and an effective separation of the water and sediment from the oil.

The invention embraces a number of special features which render it practicable of industrial application and by which it is distinguished from the prior art.

It is characterized by continuity and rapidity of action thus avoiding the extended periods of treatment and the prolonged settling required for the treatment of refractory emulsions in prior methods of treating. For example, in some of the chemical processes which have been proposed for the resolution of emulsions it is common practice to treat or dose a batch of the emulsion in a tank and then allow the contents of the tank to settle for an extended period of time, sometimes with occasional additional treatments of the chemical. It frequently happens that a treatment given to the emulsion breaks up the emulsion to a certain extent, that is, a coalescence of minute globules of water will be formed so as to produce globules of comparatively larger sizes, but in many cases, even with this partial resolution and coalescence of water particles, the entrained water may remain in suspension for long periods before it will settle out. It is obvious that methods of treatment involving such extended periods of time for completion are expensive and inconvenient. In accordance with my invention the emulsion is thoroughly resolved in an efficient and rapid manner, the oil as it is removed from the system being freed of sediment and water to such an extent that it will satisfy pipe line requirements, or for that matter it is purified to such an extent as may be desired.

One feature of the invention contemplates the passage of the heated oil or emulsion through filtering media in a horizontal path of flow therethrough. I have found that if the oil or emulsion be passed through a substantially horizontal filter stratification by gravity takes place practically simultaneously with the breaking up of the emulsion and any tendency toward re-emulsification is avoided, thus effecting an efficient separation of the water and sediment from the oil. In the preferred embodiment of the invention a plurality of alternating filtering and settling zones are provided through which the oil or emulsion is passed in a substantially horizontal path.

Another feature of the invention is that a complete separation of sediment and water from the oil takes place while the oil is in a heated condition, since it has been found that a cooling of the oil retards the desired stratification and that more expeditious results can be obtained by effecting stratification while the oil is heated. It is preferable, however, to employ comparatively low temperatures. A certain degree of heat is required but the temperature should be held as low as is consistent with the effective destruction of the emulsified bodies. It has been proposed to heat the emulsion to a temperature sufficient for vaporization of the water content, and in some cases to distill off oil vapors as well. I have found that it is not necessary to heat the emulsion so as to vaporize the water content thereof, since in the practice of my invention the emulsion may be resolved when in a liquid state. It is apparent that there is thus effected a considerable economy in fuel over the systems in which vaporization is required.

In ordinary practice it will be found that in treating a petroleum emulsion portions of the emulsion will break down and stratify into an oil and water layer sooner than other portions. It is accordingly one of the features of the present invention to remove the water and sediment from the system as it is formed to that extent increasing the capacity of the apparatus and thus avoiding any tendency for re-emulsification.

One feature of the invention is the positive forcing of the oil or emulsion through the contact or filtering material and the application of such pressure to the material being treated, under the temperatures employed, as will prevent any substantial vaporization of the oil.

The invention also contemplates an interchangeable arrangement by which the emulsion to be treated may be forced through the treating and settling zones from different directions in such a manner as to prevent the packing and clogging of the filtering media and make possible the continuous operation of the process for an extended period of time.

A further feature of the invention resides in the provision of means for aiding various chemical methods of resolving emulsions.

Various other advantages and features of the invention are brought out in the following detailed description thereof, reference being had to the accompanying drawings which illustrate a preferred embodiment of the invention and wherein:

Figure 1 is a plan view of an apparatus constructed in accordance with the invention and constituting an embodiment thereof.

Figure 2 is a side elevation thereof.

Figure 3 is an end elevation.

The apparatus illustrated embraces a heating chamber 10 and a plurality of treating vessels 11. A pump 12 is provided for charging the oil or emulsion to be treated to the apparatus. The outlet line 13 from the pump preferably passes through a heat exchanger 14 to which heat is supplied by means of the oil recovered in the process, as will presently be more fully explained. The pipe 13 communicates with the chamber 10 in which a heating coil 15 is disposed. This coil is heated by the circulation therethrough of a suitable heating medium such as steam, and the oil or emulsion passing through the chamber 10 may be heated to any desired temperature by reason of the heat exchange between the coil and the oil or emulsion. As illustrated, the coil 15 is shown as being provided with optional sources of steam heat, such as a steam line 16 adapted to be supplied with steam from a boiler or the like and an exhaust steam line 17 which may receive exhaust steam from a pump, engine or other convenient source.

The vessels 11 preferably assume the form of elongated or pipe like structures horizontally mounted and provided with spaced filter or contact sections 18. The several sections 18 may be conveniently formed by means of perforated baffles or discs 19. Each contact or filtering section 18 contains a mass of threadlike or filamentary wood or metal material, such for example as excelsior. The material is comparatively loosely packed, since the most effective operation of the process requires that while the emulsion in its passage through the filtering medium shall meet with sufficient obstruction to penetrate and destroy the minute globules of which the emulsion is composed there should nevertheless be adequate room between the particles of the obstruction media to insure the ready passage of the emulsion.

Each intervening space 20 serves as a settling zone for the stratification of the water and sediment which has been precipitated in the preceding treating section. If desired, each section 20 may be equipped with a pipe for drawing off water and sediment. It is ordinarily unnecessary, however, to provide water draw-off means at such frequent intervals and I have found that it is satisfactory to provide draw-off means every few sections. Thus, for example, each of the chambers 11 may be equipped with draw-off lines, preferably one at each end of each chamber. As illustrated, at the end of each of the sections 11 a draw-off elbow 21 extends from the lower portion of the vessel 11 and communicates with a pipe 22 equipped with a valve 23, which leads to a suitable drain pipe or other conduit, such as a drainage ditch 24. A pipe 25 places the upper portion of adjacent vessels 11 in communication so that the oil or emulsion may flow successively through the several units.

In the preferred construction a plurality of sections or vessels 11 are connected in series and several of such batteries or series installations are provided so that the several series may be used interchangeably and in accordance with various methods of operation hereinafter set forth. As illustrated, two series of vessels 11 are shown, each series consisting of four units. It is to be understood that various modifications may be made both as to the number and arrangement of units and series employed.

The heater 10 is provided with an outlet pipe 26, which is illustrated as terminating in branch lines 27 and 28, having valves 27ᵃ and 28ᵃ, respectively. The pipe 27 extends to one end of the two rows of filtering chambers and the pipe 28 extends to the other end. The pipe 28 has branch lines 29 and 30 which communicate with one end of the two rows of filtering chambers and the pipe 27 has branch lines 31 and 32 which communicate with the other end of the rows. These several branch lines are provided with valves 29ᵃ, 30ᵃ, 31ᵃ, 32ᵃ, respectively. The pipe 27 beyond its branch lines 31 and 32 has a continuation 33 provided with valve 33ᵃ. A pipe 34 having a valve 34ᵃ forms an extension of the pipe 28 and joins with pipe 33, beyond the point of the valve 33ᵃ, to form a common draw-off line 35 which serves to conduct the treated oil to the exchanger 14. A pipe 36, equipped with a valve 36ᵃ, is provided to remove the cooled oil to a suitable place of storage. A pipe 37 having a valve 37ᵃ may extend from one end of one of the rows of the treating vessels to the opposite end of the other row.

It is apparent that with the arrangement illustrated the material being treated may be forced through the treating vessels 11 in various ways. For example, the two rows may be operated in parallel. Thus with valves 27ᵃ, 37ᵃ and 34ᵃ closed and valves 28ᵃ, 29ᵃ, 30ᵃ, 31ᵃ, 32ᵃ, and 33ᵃ open the fluid may be passed through the two rows in parallel from the right to the left as viewed in Figure 1. The direction of flow may be reversed by closing valves 28ᵃ and 33ᵃ and opening valves 27ᵃ and 34ᵃ. With valves 27ᵃ, 29ᵃ, 32ᵃ, and 34ᵃ closed and with valves 28ᵃ, 30ᵃ, 37ᵃ, 31ᵃ, and 33ᵃ open the fluid may be passed in series from one row to the other.

The several vessels or pipes 11 are thoroughly insulated to prevent loss of heat and the various pipes connecting these vessels with each other and with the heater 10 are also preferably insulated.

In practicing the invention the oil or emulsion which it is desired to treat is introduced through the line 13 into the exchanger 14 wherein heat exchange takes place between the hot treated oil and the fresh charge whereby the former is cooled and the latter is heated. The oil or emulsion then passes through the heater 10 where it is heated to the desired temperature. This temperature ordinarily varies from about 180°–350° F. In treating more refractory emulsions a temperature approximating 300° F. is generally required but in many cases a temperature below 200° F. may be employed. The passage of the heated oil into the insulated treating vessels 11 maintains these chambers in a heated condition.

The fluid while in the heater and during the subsequent passage through the treating vessels is maintained under such pressure that there is no substantial vaporization, since, as stated, an effective separation of the oil, sediment and water can be effected without heating sufficiently for vaporization. The pressure employed is ordinarily from about 50 to 100 lbs. Higher pressures may be used but there does not appear to be any advantage in so doing. In general, it may be stated that only such pressure should be used as is sufficient to prevent volatilization of the water or low boiling hydrocarbons and to overcome the frictional resistance of the fluid in passing through the system. It is desirable to operate under a compartively low pressure, since better separation of oil and water is secured at the lower pressures.

The heated oil is passed through as many of the treating vessels 11 as may be found necessary. Oil field emulsions differ greatly as to the facility with which they may be broken up. In some cases a passage through one or two filter sections will suffice to make a complete separation. In other cases a number of sections must be used. In the case of the more refractory emulsions it is frequently necessary to use from 6 to 10 filter sections each of which is approximately 20 ft. in length and arranged with alternate contact and settling zones, as shown in the drawings. It is to be understood that the temperature used and the amount of contact and settling space required will vary with the emulsion treated.

During the operation of the process the water and sedimentary matters separated out from the oil are drawn off by the several lines 22, the valves 23 being regulated so as to draw off the water substantially as it is stratified. The treated oil passes through the system and after being cooled in the exchanger 14 to a temperature below that at which any material vaporization may occur is released to suitable storage means.

After the oil or emulsion has been passed through the contact vessels in a given direction for a time there is a tendency for the excelsior to pack due to the pressure of the fluid and a tendency for the treating material to clog up due to the deposit therein of sedimentary materials. It is therefore preferable to occasionally reverse the direction of flow of fluid through the contact material. In this way excessive packing of the material is prevented and solid particles collected are to a large extent flushed out. It is thus possible to operate for extended periods of time without the necessity of cleaning the apparatus.

My invention is particularly adapted to be employed in the treatment of emulsions with various chemical reagents. Thus it has been proposed to treat oil field emulsions with various water-softening agents such as metallic sulfates, caustic soda and the like, with salts or soaps of slufonic acids derived from the purification of coal tar or petroleum products and various other reagents. Some of these chemical agents have been used more or less successfully in the case of the less refractory emulsions. In treating the more refractory emulsions, however, considerable difficulty has been experienced and it is frequently necessary to allow the emulsion, after having been treated with the chemical, to stand for long periods of time in order to settle out the water and sediment and in many cases it is necessary to retreat the emulsion a number of times. In the practice of my invention the reagent desired may be admitted to the oil or emulsion to be treated, for example at the pump 12, and the mixed oil and reagent heated and then contacted with the excelsior or other equivalent material in the manner hereinbefore described in detail. By such means of treatment even the most refractory emulsions are readily broken up, the aqueous solutions being readily separated out from the oil. It is thus possible by means of my invention to avoid the prolonged periods of settling and treatment that have been previously required.

The invention has a special field of usefulness in the treatment of crude petroleum and emulsions as received from the wells, since it is possible to reduce the water and B. S. content of the petroleum to pipe line requirements in an efficient and rapid manner. When wells containing refractory emulsions are encountered it is possible to treat the oil immediately and pass it on to the refineries, thus avoiding the necessity of having to provide large storage space for the treatment and settling of the emulsions for extended periods of time.

Although the preferred embodiment of the invention has been set forth in connection with apparatus having a particular construction and arrangement of parts and mode of operation, it is obvious that various changes and modifications may be made therein, while securing to a greater or less extent some or all of the benefits of the invention, without departing from the spirit and scope thereof. Therefore, only such limitations should be imposed as are indicated in the appended claim.

What I claim is:

Apparatus for treating oil in which water is present in emulsified form comprising an elongated horizontally disposed container formed with spaced treating sections and interposed settling sections, a charging line through which the emulsion is introduced into one end of the container, a preheater in the charging line for heating the emulsion to a predetermined temperature, a pump for charging the emulsion into the container under sufficient pressure to prevent vaporization of the emulsion, a heat exchanger comprising a jacket surrounding a portion of the charging line between the pump and the preheater, means for drawing off the demulsified oil from one end of the container and for introducing the oil into the heat exchanger at one end thereof so that the oil will flow therethrough to effect a heat transfer with the untreated emulsion in the charging line.

In witness whereof I have hereunto set my hand and seal this 29th day of August, 1923.

A. B. STEEN.